United States Patent
Swierk et al.

(10) Patent No.: US 11,735,088 B2
(45) Date of Patent: Aug. 22, 2023

(54) INFORMATION HANDLING SYSTEM BLUE LIGHT EXPOSURE SYSTEM AND METHOD

(71) Applicant: Dell Products L.P., Round Rock, TX (US)

(72) Inventors: Todd E. Swierk, Austin, TX (US); Stefan Peana, Austin, TX (US); Timoteo T. Lee Kang, Boise, ID (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/153,665

(22) Filed: Jan. 20, 2021

(65) Prior Publication Data

US 2022/0230576 A1    Jul. 21, 2022

(51) Int. Cl.
  *G09G 3/20*    (2006.01)
  *G06F 3/01*    (2006.01)
  *G09G 3/3208*    (2016.01)

(52) U.S. Cl.
  CPC .......... *G09G 3/2003* (2013.01); *G06F 3/013* (2013.01); *G09G 3/2096* (2013.01); *G09G 3/3208* (2013.01); *G09G 2310/08* (2013.01); *G09G 2320/0666* (2013.01); *G09G 2354/00* (2013.01); *G09G 2360/144* (2013.01); *G09G 2360/147* (2013.01); *G09G 2360/18* (2013.01)

(58) Field of Classification Search
  CPC .. G09G 3/2003; G09G 3/2096; G09G 3/3208; G09G 2310/08; G09G 2320/0666; G09G 2354/00; G09G 2360/144; G09G 2360/147; G09G 2360/18; G06F 3/013

USPC ........................................................ 345/207
See application file for complete search history.

(56) References Cited

U.S. PATENT DOCUMENTS

| 10,984,751 | B2 | 4/2021 | Peana | |
|---|---|---|---|---|
| 2015/0070406 | A1* | 3/2015 | Baek | G09G 3/3406 345/690 |
| 2015/0243052 | A1* | 8/2015 | Park | G06T 11/001 345/589 |
| 2016/0307541 | A1* | 10/2016 | Kagaya | G06F 3/04847 |
| 2018/0130446 | A1* | 5/2018 | Guest | G09G 5/14 |
| 2018/0137837 | A1* | 5/2018 | Peana | G06F 3/147 |
| 2018/0144714 | A1* | 5/2018 | Khorasani | G09G 5/02 |
| 2018/0157035 | A1* | 6/2018 | Fujita | G02B 27/0938 |
| 2021/0082371 | A1* | 3/2021 | Novelli | G08B 21/02 |

OTHER PUBLICATIONS

U.S. Appl. No. 17/153,668, filed Jan. 20, 2021, entitled "Information Handling System Display Visual Augmentation System and Method," by inventors Stefan Peana et al.

(Continued)

*Primary Examiner* — Amare Mengistu
*Assistant Examiner* — Gloryvid Figueroa-Gibson
(74) *Attorney, Agent, or Firm* — Zagorin Cave LLP; Robert W. Holland

(57) ABSTRACT

End user cumulative blue light exposure from a display is tracked over time so that a message may be provided to the end user if the exposure exceeds a threshold. For instance, a display frame buffer is retrieved to determine an average blue light component presented at the display, which is then adjusted based upon display characteristics, such as display size, luminance and brightness, end user distance to the display and a sensed ambient blue light component.

17 Claims, 5 Drawing Sheets

(56) References Cited

OTHER PUBLICATIONS

Careueyes, "Blue Light Filter for PC," downloaded from https://care-eyes.com/ on Nov. 15, 2021, 8 pages.
F.Lux, "Software to Make Your Life Better," downloaded from https://justgetflux.com/ on Nov. 15, 2021, 2 pages.
Iris,"The World's Best Blue Light Filter and Eye Protection Software," downloaded from https://iristech.co/ on Nov. 15, 2021, 7 pages.
Microsoft, "Set Your Display for Night Time in Windows," downloaded from https://support.microsoft.com/en-us/windows/set-your-display-for-night-time-in-windows-18fe903a-e0a1-8326-4c68-fd23d7aaf136 on Nov. 15, 2021, 3 pages.
McCarthy, J., "One in Five U.S. Adults Use Health Apps, Wearable Trackers," Gallup, Dec. 11, 2019, downloaded from https://news.gallup.com/poll/269096/one-five-adults-health-apps-wearable-trackers.aspx on Nov. 15, 2021, 7 pages.
Wartella, E., "As Kids' Screen Time Surges During the Pandemic, Here's What Research Suggests," downloaded from https://www.forbes.com/sites/ellenwartella/2020/05/21/as-kids-screen-time-surges-during-the-pandemic-heres-what-research-suggests/?sh=7705239c5112#199066595112 on Nov. 15, 2021, 4 pages.
ScienceDaily,"Declining Eyesight Improved by Looking at Deep Red Light," downloaded from https://www.sciencedaily.com/releases/2020/06/200629120241.htm on Nov. 15, 2021, 3 pages.

\* cited by examiner

FIG. 5A

ALL DAY BLUE LIGHT EXPOSURE ESTIMATOR
*Version 0.2:13 April 2020*
INPUT PARAMETERS

| | VALUE | | NOTES |
|---|---|---|---|
| MAXIMUM LUMINANCE OF WHITE SCREEN (cd/m$^2$): | 300 | cd/m$^2$ | (TYPICAL: 300 cd/m$^2$) |
| SCREEN SIZE (DIAGONAL, INCHES): | 15.6 | in. | (TYPICAL: 15.6 in. LAPTOP, 27 in. LARGE MONITOR) |
| VIEWING DISTANCE (INCHES): | 18 | in. | (TYPICAL: 18 in. LAPTOP, 24 in. LARGE MONITOR) |
| BRIGHTNESS SETTING IN USE (%): | 100% | | (TYPICAL: 100% BRIGHT WINDOWED OFFICE, 80% BRIGHT INTERIOR OFFICE, 60% HOME OFFICE WITH WINDOW, 20% DIM OFFICE OR HOME) |
| SCREEN CORRELATED COLOR TEMPERATURE (CCT, K): | 6500 | K | (TYPICAL: 6500 K) |
| TYPE OF DISPLAY: | 1 | | (ENTER 1: CONVENTIONAL, 2: LOW-BLUE) |
| HORIZONTAL ILLUMINANCE ON WORKPLANE FROM AMBIENT LIGHTING (lux): | 500 | lux | (TYPICAL: 300-500 lux INTERIOR OFFICE, 500-1000 lux WINDOWED OFFICE) |
| INTERIOR OR WINDOWED OFFICE: | 1 | | (ENTER 1: INTERIOR, 2: WINDOWED) |
| AMBIENT CCT (K): | 4100 | K | (TYPICAL: 6500 K WINDOWED OFFICE, 4100 K INTERIOR OFFICE, 2700 K HOME) |
| APPLICATION FACTOR (%): | 90% | | (TYPICAL: 90% SPREADSHEET/WORD PROCESSING, 75% PRESENTATION SLIDE PREP, 20% MOVIE) |
| EYEWEAR: | 100% | | (TYPICAL: 100% NONE, 90% CLEAR EYEGLASSES, 20% TINTED SUNGLASSES) |
| NUMBER OF DISPLAYS PRESENT: | 1 | | (TYPICAL: 1 OR 2; RARELY: 3) |

FROM FIG. 5A

| OUTPUT PARAMETERS | VALUE | |
|---|---|---|
| AMBIENT ILLUMINANCE AT EYES: | 220 | lux |
| SCREEN ILLUMINANCE AT EYES: | 109 | lux |
| TOTAL ILLUMINANCE AT EYES: | 329 | lux |
| SHORT-WAVELENGTH* EXPOSURE FROM SCREEN: | 66.3 | $mW/m^2$ (SPECTRALLY-WEIGHTED IRRADIANCE) |
| SHORT-WAVELENGTH EXPOSURE FROM AMBIENT ENVIRONMENT | 77.9 | $mW/m^2$ (SPECTRALLY-WEIGHTED IRRADIANCE) |
| TOTAL SHORT-WAVELENGTH OUTPUT: | 144.2 | $mW/m^2$ (SPECTRALLY-WEIGHTED IRRADIANCE) |
| SHORT-WAVELENGTH ENERGY EXPOSURE (OVER 2.78 HOURS): | 1442 | $W·s/m^2$ (SPECTRALLY-WEIGHTED IRRADIANCE×DURATION) |
| VISUAL DISCOMFORT MARKER (VDM): | 1064 | $W·s/m^2$ (SPECTRALLY-WEIGHTED IRRADIANCE×DURATION) |
| TO ACHIEVE SAME SHORT-WAVELENGTH ENERGY AS VDM, WORK FOR: | 123 | MINUTES WITH THE CONVENTIONAL DISPLAY (EQUIVALENT TO 167 MINUTES UNDER REFERENCE) |

*Based on spectral output between 415 and 455 nm.

*VDM is based on an upper limit of 1000 lux on the workplane, above which occupants may begin to have eye complaints (Bolder 1957; Nemecek AND Grandjean 1973).

| NOTIFICATIONS | | |
|---|---|---|
| INITIAL ALARM (90% OF VDM): | 111 | MINUTES AFTER CONTINUOUS USE |
| SECOND ALARM (100% OF VDM): | 123 | MINUTES AFTER CONTINUOUS USE |
| FINAL ALARM (110% OF VDM): | 135 | MINUTES AFTER CONTINUOUS USE |

INFORMATION HANDLING SYSTEM BLUE LIGHT EXPOSURE SYSTEM AND METHOD

BACKGROUND OF THE INVENTION

Field of the Invention

The present invention relates in general to the field of information handling system visual image presentation, and more particularly to an information handling system blue light exposure system and method.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increased emphasis on working from home has resulted in greater reliance on information handling systems for employee interactions, such as by having meetings through videoconferencing instead of in person. Generally information handling systems output visual images through a display device, such as a liquid crystal display (LCD), organic light emitting diode display (OLED), a Micro-LED display, a QLED display, or similar display devices. In many instances where employees would get a break from viewing information handling system displays to perform employment duties, such as word processing and computer aided design, by leaving screens to have discussions with other employees, now those discussions are also through screen interactions. Although remote interactions offers advantages in terms of work efficiency and isolating to prevent virus spread, the increased amount of screen time can create its own stress. For example, some studies have suggested that exposure to too much blue light in front of a display can produce uncomfortable side effects. Blue light is typically generated when images are defined by pixels of a display that mix red, green and blue light to create colors. The blue portion of the image component may be generated by light emitting diodes (LEDs) used as a backlight for a display or organic light emitting diode (OLED) material that generates light at the application of power to create a color associated with the OLED material. Some evidence suggests that over exposure to blue light in the 415 to 455 nm wavelength can produce retinal damage. Other evidence suggests that exposure to blue light in the 460 to 480 nm wavelength can impact melatonin production, which impacts sleep quality. Other evidence suggests that long term cumulative blue light exposure may lead to phototoxicity that can accelerate eye aging. These effects have led to some concern that the work from home situation faced by many employees could result in over exposure to blue light as screen time increases.

One solution to this difficulty is to use less blue light in presenting visual images where possible. For example, one software solution is to reduce the blue light component used to present visual images through a combination of reduced screen brightness, adapting screen colors to match the ambient environment and relying on greater yellow or reddish visual images. Other software solutions offer timed transitions of blue light content to reduce blue light when bedtime approaches. For instance, Microsoft introduced "Night Light" mode in Windows 10 in 2017 to automatically reduce blue light based on time of day. Other software solutions include iris eye protection by IrisTech, f.lux by justgetflux.com and CareUEyes by care-eyes.com. Still other solutions include blue light screen filters and blue light blocking glasses. Although end users perceive reduction of blue light as beneficial in theory, many prefer the more blue images and thus disable the adaptive color and night light options.

SUMMARY OF THE INVENTION

Therefore, a need has arisen for a system and method which tracks end user cumulative blue light exposure at an information handling system display.

In accordance with the present invention, a system and method are provided which substantially reduce the disadvantages and problems associated with previous methods and systems to manage blue light exposure at an information handling system display. Logic executing on an information handling system processor tracks blue light generated at a display and user presence in a viewing position of the display to determine a cumulative blue light exposure and, at a threshold, presents a message to the end user at the display regarding the cumulative blue light exposure.

More specifically, an information handling system processes information with a processor that executes instructions and a memory that stores the information and instructions. A graphics processor further processes the information to define visual images with pixel values for a display frame. The graphics processor communicates the pixel values to the display through a display frame buffer. A blue light manager executing on the processor tracks the visual images defined by the pixel values to determine a blue light component presented at the display. For example, the blue light manager retrieves the display frame buffer and averages the blue light represented by the pixel values. The blue light manager tracks the blue light to determine a cumulative blue light exposure. In one embodiment, cumulative blue light exposure is summed for periods of time during which an end user is present at the display, such as is indicated by a user presence detection device, such as a time of flight sensor. The cumulative blue light exposure may be adjusted based upon a distance of the end user to the display, the size of the display, the brightness setting of the display, the maximum luminance of the display and a blue light component of ambient light conditions sensed at the display. If a threshold of cumulative blue light exposure is detected, the blue light manager issues a message to the end user, such as a suggestion to mitigate the blue light exposure by taking a break, moving further from the display, decreasing blue light content, etc . . . .

The present invention provides a number of important technical advantages. One example of an important technical advantage is that a cumulative blue light exposure of an end user at a display is tracked so that, should the end user exceed a threshold of blue light exposure, a notice is provided to the end user who can mitigate the blue light exposure. Tracking of cumulative blue light exposure over time provides a more accurate indication of when an end user should mitigate the effects of blue light, such as by adjusting the color at the display, moving further away from the display screen or taking a rest from viewing the display. An end user experience is enhanced with an ability to view a display with a full color presentation for a longer time period and receiving an indication of when a less robust color presentation should be used. Cumulative blue light exposure is compared against different thresholds to provide an end user with multiple operating conditions and mitigations to adapt display presentations to the end user's needs so that mitigation steps have less of an impact on the end user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A and 5B depicts a table of an example embodiment of inputs and outputs for a cumulative blue light exposure model that tracks end user cumulative blue light exposure.

DETAILED DESCRIPTION

An information handling system tracks end user cumulative blue light exposure at a display for improved indications that mitigation of blue light effects should be taken. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
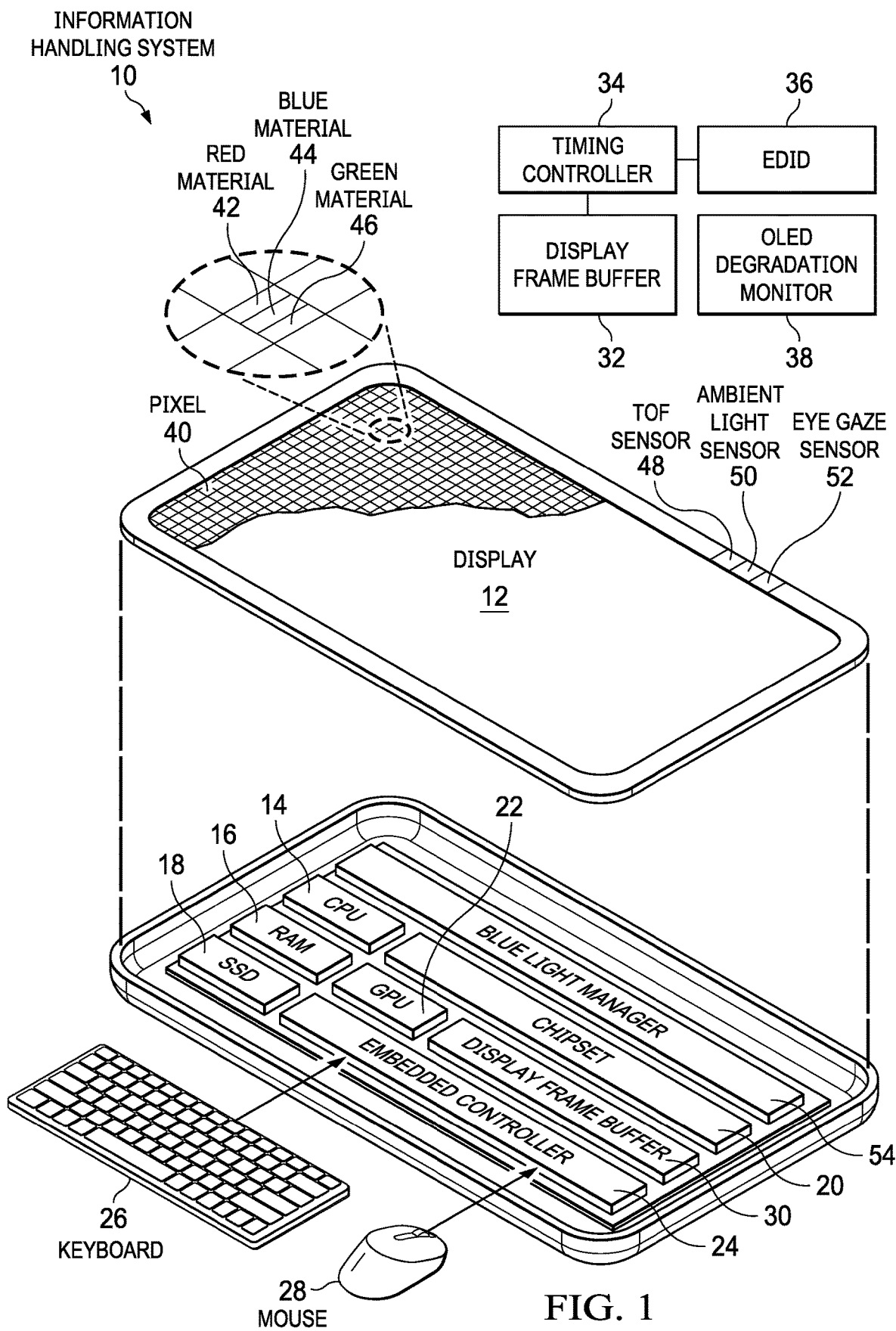
FIG. 1 depicts a block diagram of an information handling system having blue light cumulative exposure monitored at a display.

Referring now to FIG. 1, a block diagram depicts an information handling system 10 having blue light cumulative exposure monitored at a display 12. Information handling system 10 processes information by executing instructions on a central processing unit (CPU) 14 that interfaces with a random access memory (RAM) 16 that stores the information and instructions. For example, a solid state drive (SSD) 18 or other non-transient memory provides persistent storage of an operating system and applications that are retrieved to RAM 16 at power up for execution at CPU 14. A chipset 20 interfaces with CPU 14 to manage processing operations, such as clock speed and memory accesses. A graphics processing unit (GPU) 22 processes the information to generate pixel values for communication to display 12, which presents the pixel values as a visual image. An embedded controller 24 interfaces with CPU 14 to manage physical operating conditions, such as power and thermal constraints, and to accept end user interactions through input devices, such as a keyboard 26 and mouse 28. In various embodiments, information handling system 10 may have a portable configuration with display 12 integrated in a housing or a desktop configuration with display 12 interfaced as a peripheral device. Further, information handling system 10 may interface with plural displays, including both integrated and peripheral displays.

GPU 22 generates pixel values in display frames that define visual images for presentation on display 12 as a frame of the length and width of pixels 40 to which the pixel values are applied to present the visual image. For instance, pixel values of a display stored in display frame buffer 30 by GPU 22 are communicated through an interface, such as DisplayPort or HDMI ports and cables, to a display frame buffer 32 of display 12 for scanning to pixels 40. For example, a timing controller 34 interfaces with display frame buffer 32 to scan the pixel values to pixels 40 by setting red material 42, blue material 44 and green material 46 of each pixel 40 to achieve a color output defined by the pixel value. Timing controller 34 and GPU 30 interface with EDID 36, which is a flash memory that stores display characteristics, such as the size of the display, the resolution of the display, the maximum luminance of the display and other factors that define how the display presents visual images. Pixels 40 may generate visual images with liquid crystals that filter a backlight by altering transmission of the light with application of an electric field to the liquid crystals, or by organic light emitting diode (OLED) material that generates light in response to a current applied to the material. Over time, OLED material tends to deteriorate so that the amount of illumination provided by a given current will decrease. An OLED degeneration monitor 38 tracks OLED material degeneration so that a consistent image is created by adjusting current applied to the material in response to degeneration.

In the example embodiment, cumulative blue light exposure of an end user at display 12 is tracked by a blue light manager 54 that executes on CPU 14, such as in a display driver of an operating system stored in SSD 18 and retrieved to RAM 16. In alternative embodiments, blue light manager 54 may execute as software or firmware on other processing resources, such as GPU 22, embedded controller 24 and timing controller 34. Blue light manager determines an amount of blue light at a given time by retrieving display characteristics from EDID 38 to determine the size, maximum luminous and brightness of display 12, and then applies the display characteristics to the visual images presented by display 12 to determine a blue light component of illumination. Blue light manager 54 tracks a cumulative amount of blue light exposure by adding samples of exposure over time when an end user is detected in a viewing position at the display. End user presence may be estimated based upon input detection and content presented at the display, or by directly sensing an end user with a time of flight sensor 48, eye gaze sensor 52 or other user presence detection device. Blue light exposure may be adjusted further when a distance to the end user is available, such as from the time of flight sensor, or when an eye gaze direction provides an area of focus by the end user on the display versus looking away from a display. In addition, blue light exposure may be adjusted based upon a blue light component of ambient light sensed by an ambient light sensor 50. Blue light manager 54, in various embodiments, may determine an amount of blue light emission by monitoring display pixel presentations. For example, blue light manager 54 may: perform screen capture of a display frame where every pixel is analyzed and summed to determine an amount of total blue light from a display; take a linear histogram of the screen and use the average as the total value of blue energy output from the display frame; or estimate blue energy presented by the display based on visual images presented as part of certain applications, such as email, Excel, Power Point, audiovisual players, etc . . . , then determine an average of blue output per application.

As an example, blue light manager 54 periodically samples display frames retrieved from display frame buffer 50 and determines a blue light component by averaging the blue light output defined by the pixel values. As an alternative, blue light manager 54 may periodically sample OLED degradation monitor 38 and determine the amount of blue light exposure based upon the degradation of blue OLED material in a sample period. The interval between samples may be varied based upon the type of content presented at display 12, such as by increasing the number of samples if display content changes more often and decreasing the samples if the display content is static. Over time, the blue light exposure is summed to track a cumulative blue light exposure and compared against one or more thresholds to determine if the end user should be notified so that the end user can take mitigation steps. For example, time in front of the display is based upon user presence detection and the blue light exposure is summed for each sample interval where user presence is detected. In the event that user presence detection is not available, blue light exposure messages may be issued with time periods so that an end user can estimate their cumulative blue light exposure based on their knowledge of viewing time. If user presence information is available, the position of the user, the portion of the display viewed and similar information may be used to obtain more precise estimates of cumulative blue light exposure. Mitigations offered to the end user may include messages recommending a screen break, a greater distance from the display, an automated reduction of blue light illumination with a dark mode or reduced brightness or other suggestions that reduce blue light exposure. The estimate of cumulative blue light exposure can include multiple displays and, if a camera is available, facial recognition to verify that the same user is present during the exposure time.

Figure 2:
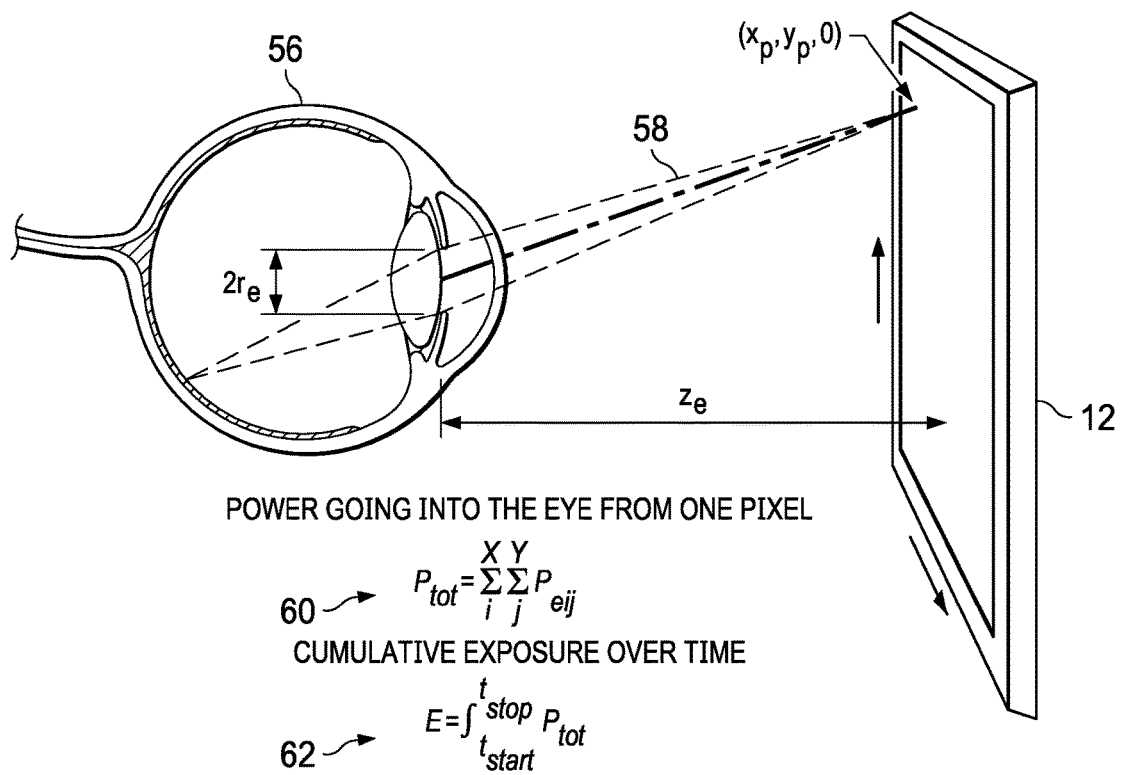
FIG. 2 depicts an example of blue light summation to track cumulative blue light exposure at a display.

Referring now to FIG. 2, an example depicts blue light summation to track cumulative blue light exposure at a display. An end user eye 56 focuses on a display 12 to receive display illumination as indicated by light path 58. The pixel total illumination for display 12 is the sum of the power P for each pixel location x,y summed for the pixel matrix from i to j. The cumulative blue light energy E is determined from the integral of the power over a start and stop time. For instance, the start and stop times can be based upon detection of an end user viewing the display. As described above, the power of blue illumination at a pixel is based upon the portion of the light in the blue light spectrum of interest, the screen brightness, the distance and other factors.

Figure 3:
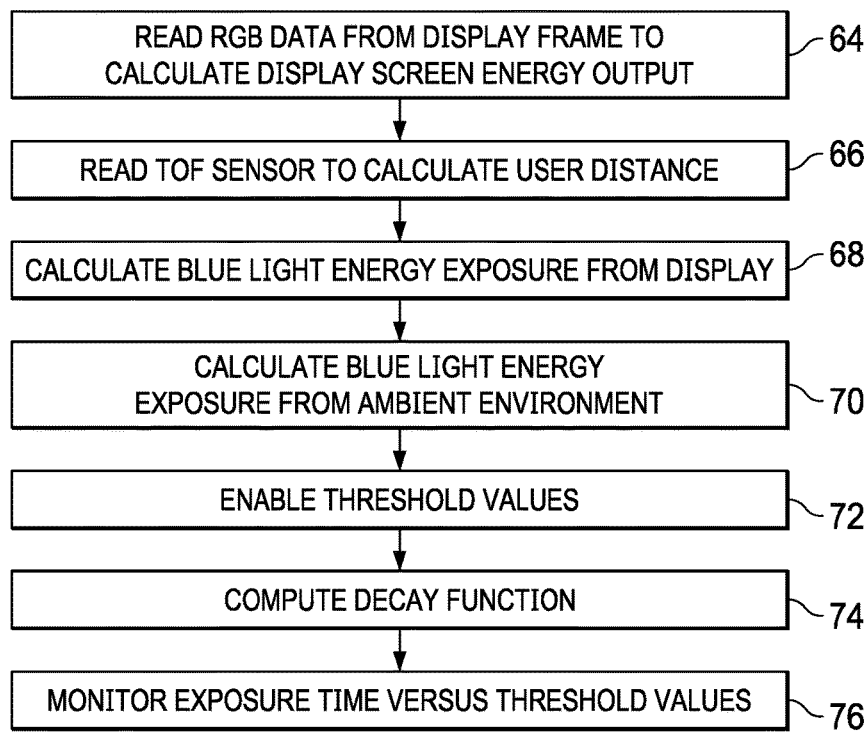
FIG. 3 depicts a flow diagram of data flows that track cumulative blue light exposure.

Referring now to FIG. 3, a flow diagram depicts data flows that track cumulative blue light exposure. The process starts at step 64 with a reading of the RGB data for pixel values retrieved from a display frame buffer to calculate the display screen energy output in the blue light spectrum. At step 66, the time of flight sensor data is read to determine user presence and distance of the user to the display screen. At step 68, the blue light energy exposure is calculated based upon the blue light presented at the display and the end user distance to the display. The blue light energy calculation reflects the amount of blue light energy that the eye is exposed to at a sample time period. At step 70, the ambient light exposure is read and a blue light component is determined, such as from a measurement of the brightness and temperature color of the ambient light. As an alternative or in addition to the use of an ambient light sensor, a CRGB sensor may be used to capture ambient light brightness and color. Ambient blue light can increase the amount of blue light that the end user experiences and can also increase the impact of blue light where a low ambient light condition increases the eyes absorption of light. At step 72, threshold values are enabled to use for a comparison with cumulative blue light energy. The threshold values may be individualized for user preference or can be set based on use conditions, such as an end user's age and sensitivity to blue light. At step 74 a decay function is computed that estimates cumulative blue light exposure versus the thresholds as time passes. At step 76, the exposure time is monitored versus the thresholds so that messages related to mitigation may be issued at the display if a threshold is exceeded.

Figure 4:
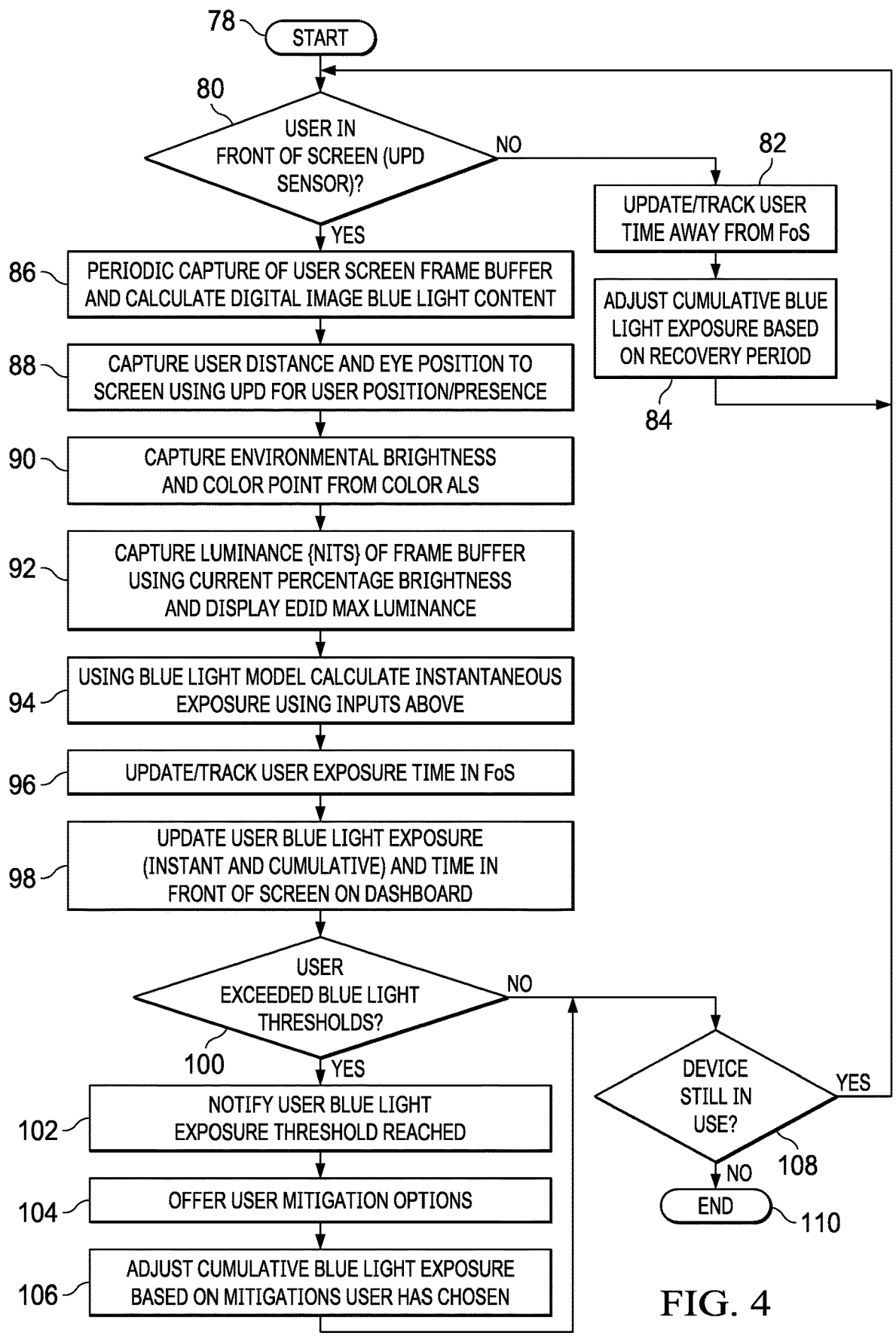
FIG. 4 depicts a flow diagram of a process for monitoring cumulative blue light exposure at a display.

Referring now to FIG. 4, a flow diagram depicts a process for monitoring cumulative blue light exposure at a display. The process starts at step 78, such as with system power up, and continues to step 80 to determine if an end user is present at the display screen, such as with detection by a time of flight sensor. If not, the process continues to step 82 to track the end user as away from the display screen and to step 84 to adjust the end user cumulative blue light exposure based upon end user recovery due to time away from the display blue light exposure. The process then returns to step 80 to continue monitoring for end user presence. If at step 80 the end use presence is detected, the process continues to step 86 to periodically perform a capture of the display screen frame buffer and calculate blue light content of the digital visual image, such as with a averaging of blue light component of pixel values across the display frame. At step 88, a distance to the end user and eye gaze of the end user are captured with a time of flight sensor and eye gaze sensor to aid in evaluation of the blue eye light exposure power, such as to decrease the exposure power as distance and increase and where the eye gaze is directed away from the display. At step 90, ambient light conditions are captured by an ambient light sensor to determine a blue light component in the ambient light and the impact of ambient light on end user absorption of display blue light, such as with increased sensitivity in low ambient light conditions. At step 92, the display luminance is captured in nits for the display frame buffer using the brightness setting and display EDID maximum luminance. At step 94, the pixel value, user position, brightness and luminance are applied to a model, such as shown in FIG. 5, to calculate an instantaneous blue light exposure for the end user at the periodic sample. At step 96, the end user exposure and presence data is tracked in a local database. Although the example embodiment determines user blue light exposure with application executing on the system CPU, in alternative embodiments blue light exposure may be tracked at a GPU or at a processing element of the display, such as a timing controller.

Once a periodic sample blue light exposure power is determined, the process continues to step 98 to update the end user cumulative blue light exposure and time at the display screen. Once the cumulative blue light exposure is determined, the process continues to step 100 to determine if the end user has exceeded any blue light exposure thresholds. If a threshold is exceeded, the process continues to step 102 to notify the end user that a blue light threshold was exceeded, such as with a message the display or an audible warning. At step 104, the end user may be offered mitigation steps to reduce the impact of the blue light exposure, such as taking a rest from viewing the display or adjusting the blue light presented at the display. In one alternative embodiment, detection of a threshold may automatically implement mitigation steps, such as commanding a night mode or other reduction in blue light illumination. At step 106 the cumulative blue light exposure is adjusted based upon any mitigation steps that are taken. From step 100, if no thresholds are met, and step 106, if mitigation steps are taken, the process continues to step 108 to determine if the information handling system is still in use. If not, the process ends at step 110. If system use continues, the process returns to step 80 to continue monitoring blue light exposure.

Referring now to FIGS. 5A and 5B, a table depicts an example embodiment of inputs and outputs for a cumulative blue light exposure model that tracks end user cumulative blue light exposure. The example table illustrates inputs retrieved by a cumulative blue light exposure model from a display, including maximum luminance, screen size, brightness setting, color temperature, type of display and the number of displays that are present. In addition, the model tracks end user viewing conditions, such as a viewing distance, ambient light conditions and end user eyewear. In addition, the model tracks the applications active at the display and illumination blue light content presented by the applications, as set forth above. The inputs are applied to generate output parameters that monitor blue light exposure and cumulative exposure over time. For example, ambient and display screen illuminance is added to provide a total illuminance at the end user eyes. From the total illuminance, a blue light short wavelength illuminance is determined based upon the amount of blue light in the display content and the ambient light. The model provides a cumulative blue light exposure in the example of 2.78 hours and sets a discomfort market and time limit for the exposure. In the example, three cumulative exposure time alarms are set to provide notifications to the end user regarding excessive blue light exposure.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instruction to process information;
   a memory interfaced with the processor and operable to store the instructions and information;
   a persistent storage device having non-transient memory operable to store the instructions and information;
   one or more input devices interfaced with the processor and operable to accept end user inputs for communication to the processor;
   a graphics processor interfaced with the processor and operable to process the information to generate pixel values that define visual images;
   a display interfaced with the graphics processor and operable to apply the pixel values to pixels to present the visual image, the pixels having a blue component that outputs blue light;
   an ambient light sensor operable to detect ambient light proximate to the display; and
   a blue light manager having instructions stored in the persistent storage device that when executed on the processor monitors visual images presented at the display and user interactions with the visual images to determine a cumulative blue light exposure of the end user, the instructions further retrieving a blue light component of the ambient light and analyzing the blue light component of the ambient light in combination with the blue component of the pixel values to determine the cumulative blue light exposure as a combination of blue light exposure by the pixel values and the ambient light, the blue light component of the ambient light applied independent of the total ambient light.

2. The information handling system of claim 1 further comprising:
   a display frame buffer interfaced with the graphics processor to store the pixel values for communication to the display;
   wherein the blue light manager instructions interface with the display frame buffer and analyze the pixel values to determine an amount of blue light exposure associated with a display frame of pixels.

3. The information handling system of claim 2 wherein the blue light manager instructions interface with the display to retrieve a brightness setting of the display and analyze the brightness setting to determine the blue light exposure associated with the display frame of pixels.

4. The information handling system of claim 2 further comprising:
   a user presence detection device operable to detect a user presence at the display;
   wherein the blue light manager instructions interface with the user presence detection device and analyze the user presence to determine the blue light exposure.

5. The information handling system of claim 4 wherein:
   the user presence detection device comprises an infrared time of flight device operable to detect an end user distance to the display; and
   the blue light manager instructions apply the end user distance to adjust the blue light exposure.

6. The information handling system of claim 4 wherein:
   the user presence detection device comprises an eye gaze detector operable to detect an end user gaze direction; and
   the blue light manager instructions apply the end user eye gaze direction to determine user presence to adjust the blue light exposure.

7. The information handling system of claim 1 further comprising:

a non-transitory memory associated with the display and storing display information including at least display size and display luminance;

wherein the blue light manager instructions retrieve the display information and apply the display information to determine blue light exposure.

8. The information handling system of claim 1 wherein:

the display comprises an organic light emitting diode display; and wherein the blue light manager instructions analyze a linear histogram to average blue energy output from a frame to determine a blue light exposure.

9. A method for measuring blue light exposure of an end user viewing a display, the method comprising:

tracking over a predetermined time blue light illuminated by the display pixels;

tracking over the predetermined time the end user presence in a viewing position of the display pixels;

measuring over the predetermined time ambient light at the display including ambient light and a blue component of ambient light;

applying the blue light illuminated and the end user presence to determine an end user cumulative blue light exposure during the predetermined time;

adjusting the cumulative blue light exposure based upon the blue component of the ambient light tracked over the predetermined time; and presenting a message at the display when the end user cumulative blue light exposure during the predetermined time exceeds a threshold.

10. The method of claim 9 wherein the tracking blue light illuminated by the display pixels further comprises:

storing a display frame of pixel values output by a graphics processor in a display frame buffer for communication to the display;

copying the display frame to a processor to execute logic that averages a blue light component of the display frame of pixel values.

11. The method of claim 9 wherein the tracking blue light illuminated by the display pixels further comprises:

tracking a linear histogram of visual images at the display; and applying an average of blue energy output from the linear histogram to determine the blue light energy output.

12. The method of claim 9 further comprising:

retrieving display characteristics from the display including at least display size and maximum luminance; and applying the display characteristics to determine the end user cumulative blue light exposure.

13. The method of claim 9 further comprising:

measuring a distance between the end user and the display; and adjusting the cumulative blue light exposure based upon the distance.

14. The method of claim 9 further comprising:

detecting an eye gaze of the end user; and adjusting the cumulative blue light exposure based upon whether the end user eye gaze is directed towards or away from the display.

15. A system for managing end user exposure to blue light at a display, the system comprising:

a processor operable to execute instructions;

an ambient light sensor operable to detect ambient light at the display including total ambient light and a blue light component of the ambient light; and a non-transitory memory interfaced with the processor and storing instructions that when executed on the processor:

track blue light illuminated by the display;

track the end user presence in a viewing position at the display;

determine a cumulative blue light exposure of the end user over a viewing time based upon the blue light illuminated by the display and the end user presence over the viewing time;

adjusting the cumulative blue light exposure based upon the blue light component of the ambient light by adding the blue light component of the ambient light and the cumulative blue light exposure;

comparing the cumulative blue light exposure against one or more thresholds; and presenting a message at the display when the one or more thresholds is exceeded.

16. The system of claim 15 further comprising:

a time of flight sensor operable to detect end user presence and a distance to the end user;

wherein the instructions when executed on the processor adjust the cumulative blue light exposure based upon the end user distance.

17. The system of claim 15 wherein the instructions adjust cumulative blue light exposure with a recovery time based upon end user absence from the display.

* * * * *